US012707321B2

(12) United States Patent
Speicher et al.

(10) Patent No.: US 12,707,321 B2
(45) Date of Patent: Aug. 11, 2026

(54) TETHERING DELAY BUDGET FOR QUALITY OF SERVICE CONFIGURATIONS

(71) Applicant: QUALCOMM Incorporated, San Diego, CA (US)

(72) Inventors: Sebastian Speicher, Wallisellen (CH); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 18/705,976

(22) PCT Filed: Dec. 9, 2022

(86) PCT No.: PCT/US2022/081275
§ 371 (c)(1),
(2) Date: Apr. 29, 2024

(87) PCT Pub. No.: WO2023/146710
PCT Pub. Date: Aug. 3, 2023

(65) Prior Publication Data

US 2026/0143378 A1 May 21, 2026

(30) Foreign Application Priority Data

Jan. 27, 2022 (GR) .............................. 20220100076

(51) Int. Cl.
*H04L 47/2416* (2022.01)
*H04W 28/02* (2009.01)
(Continued)

(52) U.S. Cl.
CPC ....... *H04W 28/0268* (2013.01); *H04W 76/20* (2018.02); *H04W 80/02* (2013.01)

(58) Field of Classification Search
CPC .. H04W 28/0268; H04W 76/20; H04W 80/02
See application file for complete search history.

(56) References Cited

U.S. PATENT DOCUMENTS

| | | | | |
|---|---|---|---|---|
| 2022/0014475 | A1* | 1/2022 | Sun | H04W 28/0236 |
| 2022/0141703 | A1* | 5/2022 | Dhammawat | H04W 76/12<br>370/328 |
| 2023/0362711 | A1* | 11/2023 | Bang | H04W 28/0268 |

OTHER PUBLICATIONS

International Search Report and Written Opinion—PCT/US2022/081275—ISA/EPO—Mar. 28, 2023.

(Continued)

*Primary Examiner* — Derrick V Rose
(74) *Attorney, Agent, or Firm* — Harrity & Harrity, LLP

(57) ABSTRACT

Various aspects of the present disclosure generally relate to wireless communication. In some aspects, a network controller may receive, from a user equipment (UE), a request for a tethering delay budget associated with a quality of service (QoS) flow, wherein the UE is in communication with an access point associated with a client network, and wherein the tethering delay budget is based at least in part on a tethering delay associated with the client network. The network controller may configure one or more QoS parameters, associated with the wireless communication network, for the QoS flow, wherein the one or more QoS parameters are configured based at least in part on the tethering delay budget. The network controller may transmit, to the UE, a communication based at least in part on the one or more QoS parameters. Numerous other aspects are described.

30 Claims, 10 Drawing Sheets

(51) Int. Cl.
*H04W 76/20* (2018.01)
*H04W 80/02* (2009.01)

(56) References Cited

OTHER PUBLICATIONS

Qualcomm Incorporated: "QoS Considerations for WLAR and WTAR", 3GPP TSG-S4 Meeting #116-e, S4-211388, 3rd Generation Partnership Project, Mobile Competence Centre, 650, Route Des Lucioles, F-06921 Sophia-Antipolis Cedex, France, No. Online, Nov. 10, 2021-Nov. 19, 2021, 4 Pages, Nov. 4, 2021, XP052179724, the whole document.

Thomas (Qualcomm Incorporated) S., et al., "[FS_SmarTAR] Latency Aspects for SmarTAR", [FS_SmarTAR] Key Issue #1: Latentcy-Measurement, 3GPP SA4 MBS SWG, S4-221319, 3GPP, Mobile Competence Centre, 650, Route Des Lucioles, F-06921 Sophia-Antipolis Cedex, France, vol. 3GPP SA 4, No. Toulouse, FR, Nov. 14, 2022-Nov. 18, 2022, Nov. 8, 2022, XP052225535, 8 Pages, the whole document.

Youngkyo (Samsung) B., et al., "Solution on Multi-Modality Support for UE Connected with Tethered Device(s) (Key issue #1 & #2)", SA WG2 Meeting #152E e-meeting, S2-2206401, 3rd Generation Partnership Project, Mobile Competence Centre, 650, Route Des Lucioles, F-06921 Sophia-Antipolis Cedex, France, vol. 3GPP SA 2, No. Online, Elbonia, Aug. 17, 2022-Aug. 26, 2022, Aug. 10, 2022, XP052184797, pp. 1-4, the whole document.

* cited by examiner

400

TETHERING DELAY BUDGET FOR QUALITY OF SERVICE CONFIGURATIONS

CROSS-REFERENCE TO RELATED APPLICATIONS

This Patent Application is the 371 National Phase of PCT Application No. PCT/US2022/081275, filed Dec. 9, 2022, entitled "TETHERING DELAY BUDGET FOR QUALITY OF SERVICE CONFIGURATIONS." and claims priority to Greece Patent Application Serial No. 20220100076, filed on Jan. 27, 2022, entitled "TETHERING DELAY BUDGET FOR QUALITY OF SERVICE CONFIGURATIONS," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for allocating a tethering delay budget for quality of service configurations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network controller of a wireless communication network. The method may include receiving, from a user equipment (UE), a request for a tethering delay budget associated with a quality of service (QoS) flow, wherein the UE is in communication with an access point associated with a client network, and wherein the tethering delay budget is based at least in part on a tethering delay associated with the client network. The method may include configuring one or more QoS parameters, associated with the wireless communication network, for the QoS flow, wherein the one or more QoS parameters are configured based at least in part on the tethering delay budget. The method may include transmitting, to the UE, a communication based at least in part on the one or more QoS parameters.

Some aspects described herein relate to a method of wireless communication performed by a UE associated with a wireless communication network. The method may include receiving, from an access point associated with a client network, an indication of a tethering delay associated with the client network. The method may include transmitting, to a network controller of the wireless communication network, a request for a tethering delay budget associated with a QoS flow, wherein the tethering delay budget is based at least in part on the tethering delay associated with the client network. The method may include receiving, from the network controller, a communication associated with the QoS flow, wherein one or more QoS parameters for the QoS flow are configured, by the network controller, based at least in part on the tethering delay budget. The method may include transmitting, to the access point, the communication.

Some aspects described herein relate to an apparatus for wireless communication at a network controller. The apparatus may include a memory and one or more processors coupled to the memory. The one or more processors may be configured to receive, from a UE, a request for a tethering delay budget associated with a QoS flow, wherein the UE is in communication with an access point associated with a client network, and wherein the tethering delay budget is based at least in part on a tethering delay associated with the client network. The one or more processors may be configured to configure one or more QoS parameters, associated with a wireless communication network, for the QoS flow, wherein the one or more QoS parameters are configured based at least in part on the tethering delay budget. The one or more processors may be configured to transmit, to the UE, a communication based at least in part on the one or more QoS parameters.

Some aspects described herein relate to an apparatus for wireless communication at a UE. The UE may include a memory and one or more processors coupled to the memory. The one or more processors may be configured to receive, from an access point associated with a client network, an indication of a tethering delay associated with the client network. The one or more processors may be configured to transmit, to a network controller of a wireless communication network, a request for a tethering delay budget associated with a QoS flow, wherein the tethering delay budget is based at least in part on the tethering delay associated with the client network. The one or more processors may be configured to receive, from the network controller, a communication associated with the QoS flow, wherein one or more QoS parameters for the QoS flow are configured, by the network controller, based at least in part on the tethering delay budget. The one or more processors may be configured to transmit, to the access point, the communication.

Some aspects described herein relate to a non-transitory computer-readable medium that stores a set of instructions for wireless communication by a network controller. The set of instructions, when executed by one or more processors of the network controller, may cause the network controller to receive, from a UE, a request for a tethering delay budget associated with a QoS flow, wherein the UE is in communication with an access point associated with a client network, and wherein the tethering delay budget is based at least in part on a tethering delay associated with the client network. The set of instructions, when executed by one or more processors of the network controller, may cause the network controller to configure one or more QoS parameters, associated with a wireless communication network, for the QoS flow, wherein the one or more QoS parameters are configured based at least in part on the tethering delay budget. The set of instructions, when executed by one or more processors of the network controller, may cause the network controller to transmit, to the UE, a communication based at least in part on the one or more QoS parameters.

Some aspects described herein relate to a non-transitory computer-readable medium that stores a set of instructions for wireless communication by a UE. The set of instructions, when executed by one or more processors of the UE, may cause the UE to receive, from an access point associated with a client network, an indication of a tethering delay associated with the client network. The set of instructions, when executed by one or more processors of the UE, may cause the UE to transmit, to a network controller of a wireless communication network, a request for a tethering delay budget associated with a QoS flow, wherein the tethering delay budget is based at least in part on the tethering delay associated with the client network. The set of instructions, when executed by one or more processors of the UE, may cause the UE to receive, from the network controller, a communication associated with the QoS flow, wherein one or more QoS parameters for the QoS flow are configured, by the network controller, based at least in part on the tethering delay budget. The set of instructions, when executed by one or more processors of the UE, may cause the UE to transmit, to the access point, the communication.

Some aspects described herein relate to an apparatus for wireless communication. The apparatus may include means for receiving, from a UE, a request for a tethering delay budget associated with a QoS flow, wherein the UE is in communication with an access point associated with a client network, and wherein the tethering delay budget is based at least in part on a tethering delay associated with the client network. The apparatus may include means for configuring one or more QoS parameters, associated with the wireless communication network, for the QoS flow, wherein the one or more QoS parameters are configured based at least in part on the tethering delay budget. The apparatus may include means for transmitting, to the UE, a communication based at least in part on the one or more QoS parameters.

Some aspects described herein relate to an apparatus for wireless communication. The apparatus may include means for receiving, from an access point associated with a client network, an indication of a tethering delay associated with the client network. The apparatus may include means for transmitting, to a network controller of a wireless communication network, a request for a tethering delay budget associated with a QoS flow, wherein the tethering delay budget is based at least in part on the tethering delay associated with the client network. The apparatus may include means for receiving, from the network controller, a communication for transmission, by the apparatus, to the client network, wherein the communication is associated with the QoS flow, and wherein one or more QoS parameters for the QoS flow are configured, by the network controller, based at least in part on the tethering delay budget. The apparatus may include means for transmitting, to the access point, the communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
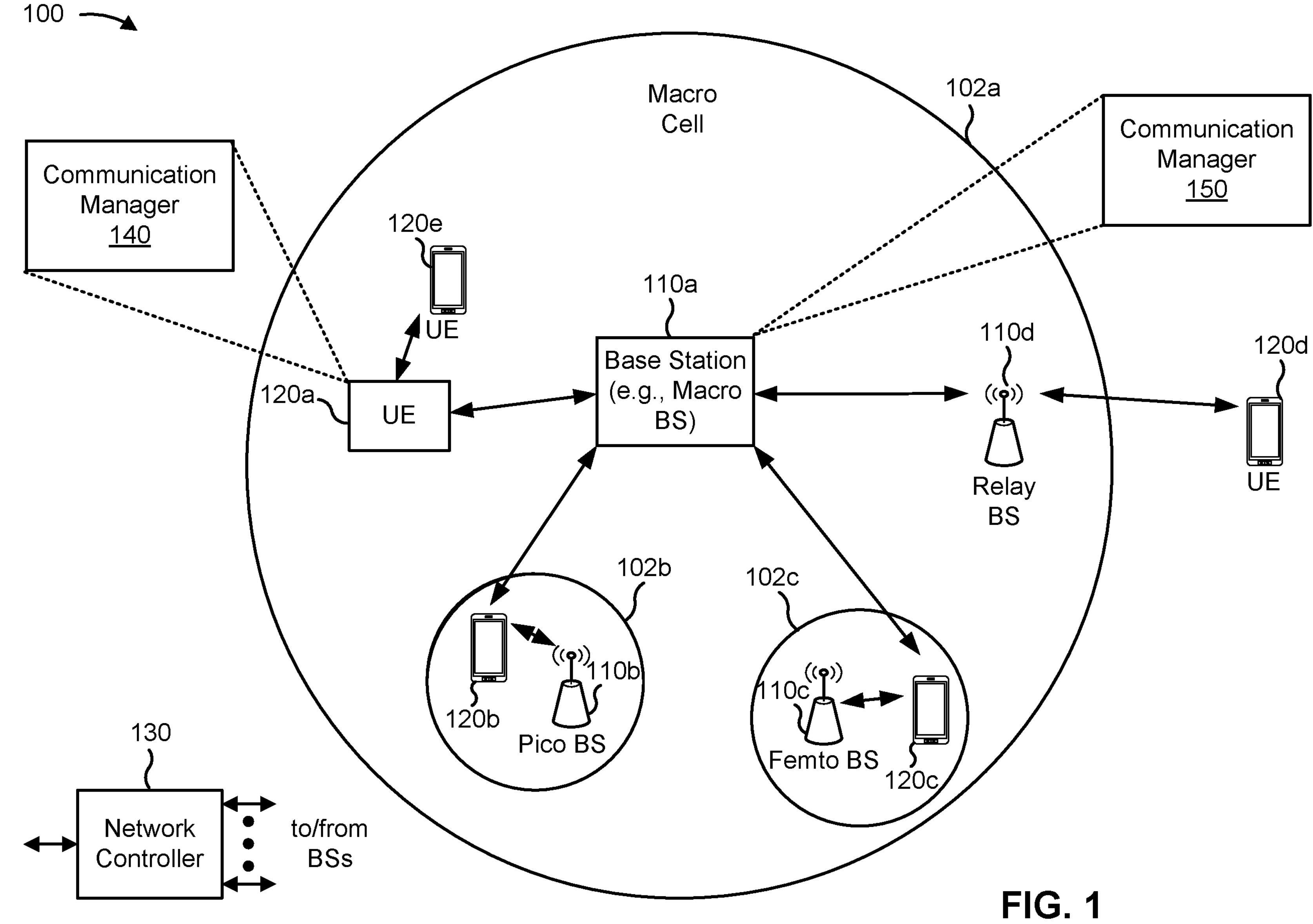
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the base station 110 may include a communication manager 150. As described in more detail elsewhere herein, the communication manager 150 may receive, from a UE, a request for a tethering delay budget associated with a quality of service (QoS) flow, wherein the UE is in communication with an access point associated with a client network, and wherein the tethering delay budget is based at least in part on a tethering delay associated with the client network; configure one or more QoS parameters, associated with a wireless communication network (e.g., the wireless network 100), for the QoS flow, wherein the one or more QoS parameters are configured based at least in part on the tethering delay budget; and transmit, to the UE, a communication based at least in part on the one or more QoS parameters. Additionally, or alternatively, the communication manager 150 may perform one or more other operations described herein.

In some aspects, the UE 120 may include a communication manager 140. As described in more detail elsewhere herein, the communication manager 140 may receive, from an access point associated with a client network, an indication of a tethering delay associated with the client network; transmit, to a network controller of the wireless communication network, a request for a tethering delay budget associated with a QoS flow, wherein the tethering delay budget is based at least in part on the tethering delay associated with the client network; receive, from the network controller, a communication associated with the QoS flow, wherein one or more QoS parameters for the QoS flow are configured, by the network controller, based at least in part on the tethering delay budget; and transmit, to the access point, the communication. Additionally, or alternatively, the communication manager 140 may perform one or more other operations described herein.

As indicated above, FIG. 1 is provided as an example. Other examples may differ from what is described with regard to FIG. 1.

Figure 2:
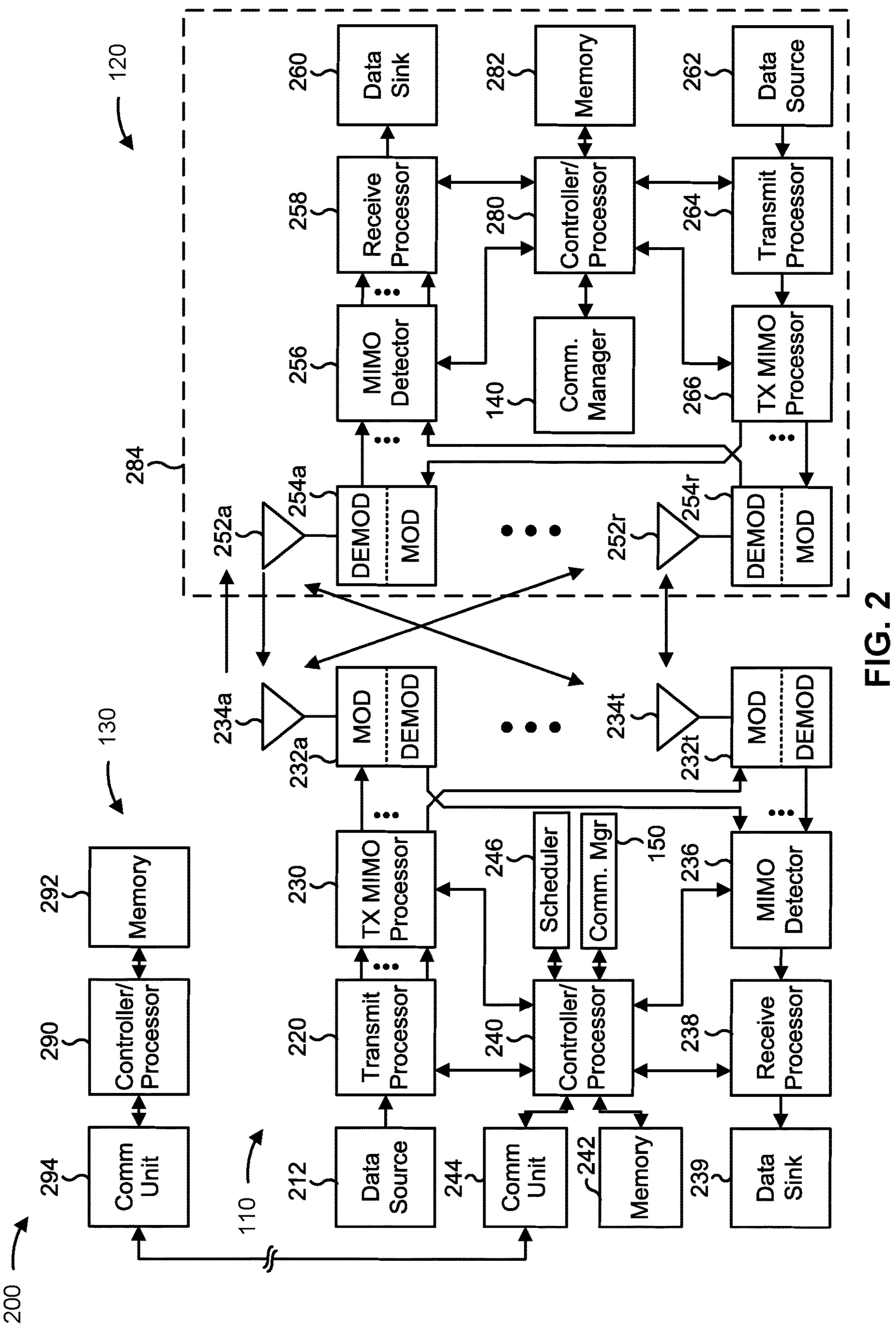
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, the controller/processor 290 of the network controller 130, and/or any other component(s) of FIG. 2 may perform one or more techniques associated with allocating a tethering delay budget for QoS configurations, as described in more detail elsewhere herein. In some aspects, the network controller described herein (e.g., the network controller 605 described in connection with FIG. 6, below) is the base station 110, is included in the base station 110, or includes one or more components of the base station 110 shown in FIG. 2. In some other aspects, the network controller described herein (e.g., the network controller 605 described in connection with FIG. 6, below) is the network controller 130, is included in the network controller 130, or includes one or more components of the network controller 130 shown in FIG. 2. For example, the controller/processor 240 of the base station 110, the controller/processor 280 of the UE 120, the controller/processor 290 of the network controller 130, and/or any other component(s) of FIG. 2 may perform or direct operations of, for example, process 700 of FIG. 7, process 800 of FIG. 8, and/or other processes as described herein. The memory 242, the memory 282, and the memory 292 may store data and program codes for the base station 110, the UE 120, and the network controller 130, respectively. In some examples, the memory 242, the memory 282, and/or the memory 292 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110, the UE 120, and/or the network controller 130 may cause the one or more processors, the UE 120, the base station 110, and/or the network controller 130 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the base station 110 and/or the network controller 130 includes means for receiving, from a UE, a request for a tethering delay budget associated with a QoS flow, wherein the UE is in communication with an access point associated with a client network, and wherein the tethering delay budget is based at least in part on a tethering delay associated with the client network; means for configuring one or more QoS parameters, associated with the wireless communication network, for the QoS flow, wherein the one or more QoS parameters are configured based at least in part on the tethering delay budget; and/or means for transmitting, to the UE, a communication based at least in part on the one or more QoS parameters. In some aspects, the means for the network controller to perform operations described herein may include, for example, one or more of communication manager 150, transmit processor 220, TX MIMO processor 230, modem 232, antenna 234, MIMO detector 236, receive processor 238, controller/processor 240, memory 242, scheduler 246, controller/processor 290, or communication unit 294.

In some aspects, the UE 120 includes means for receiving, from an access point associated with a client network, an indication of a tethering delay associated with the client network; means for transmitting, to a network controller of the wireless communication network, a request for a tethering delay budget associated with a QoS flow, wherein the tethering delay budget is based at least in part on the tethering delay associated with the client network; means for receiving, from the network controller, a communication associated with the QoS flow, wherein one or more QoS parameters for the QoS flow are configured, by the network controller, based at least in part on the tethering delay budget; and/or means for transmitting, to the access point, the communication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
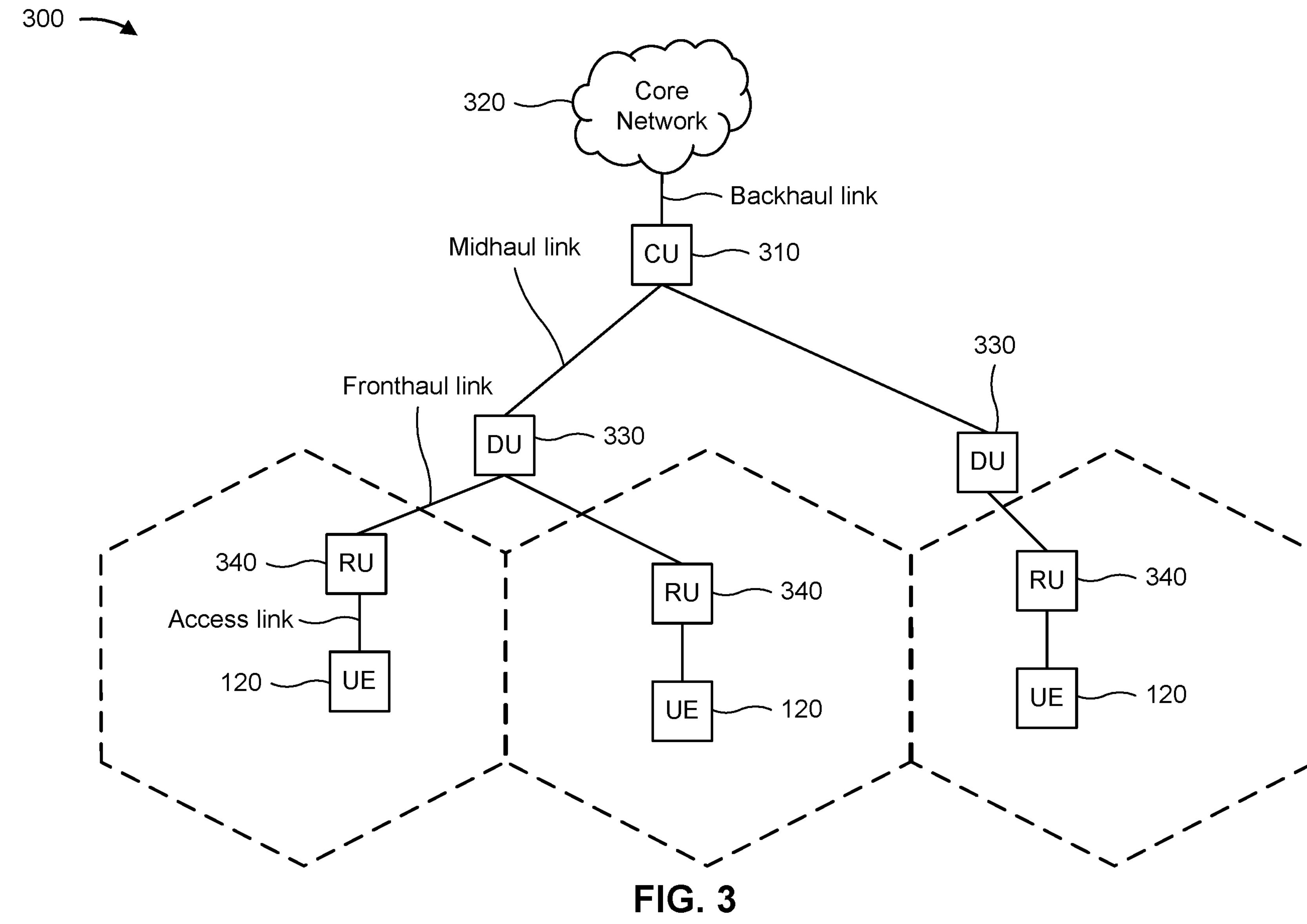
FIG. 3 is a diagram illustrating an example of an open radio access network architecture, in accordance with the present disclosure.

FIG. 3 is a diagram illustrating an example 300 of an open radio access network (RAN) (O-RAN) architecture, in accordance with the present disclosure. In some aspects, the base station 110 or another network device described above in connection with FIGS. 1 and 2 may be disaggregated according to the O-RAN architecture shown in FIG. 3. The O-RAN architecture may include a control unit (CU) 310 that communicates with a core network 320 via a backhaul link. Furthermore, the CU 310 may communicate with one or more distributed units (DUs) 330 via respective midhaul links. The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
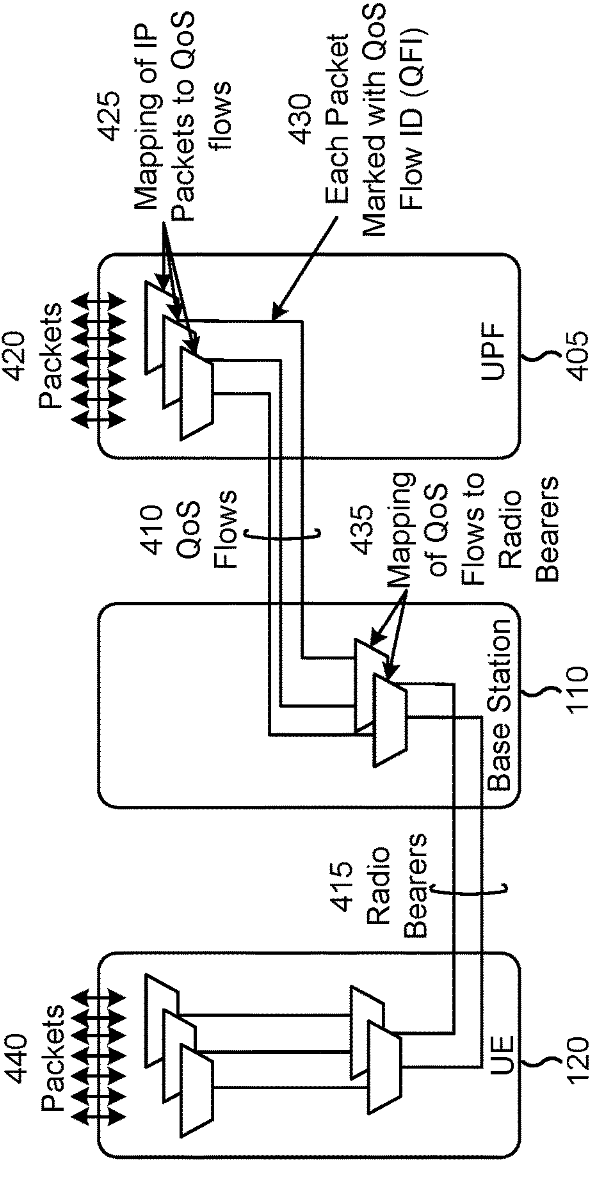
FIG. 4 is a diagram illustrating an example of a packet data unit (PDU) session for handling various quality of service (QoS) flows, in accordance with the present disclosure.

FIG. 4 is a diagram illustrating an example 400 of a packet data unit (PDU) session for handling various QoS flows, in accordance with the present disclosure. As shown in FIG. 4, a UE 120, a base station 110, and a user plane function (UPF) 405 of a core network may communicate with each other using one or more QoS flows 410 and one or more radio bearers 415. Although shown as an integral unit for ease of description, in some aspects (e.g., in aspects implementing an O-RAN architecture), the base station 110 may be disaggregated, as described in connection with FIG. 3.

The example PDU session shown in FIG. 4 may be established when the UE 120 connects to a wireless network (e.g., the wireless network 100) via the base station 110. The PDU session may be established for purposes of handling multiple QoS flows, with all traffic within a given QoS flow receiving the same forwarding treatment. For example, time-sensitive communications may be associated with a relatively high QoS priority, and thus may be mapped to a QoS flow associated with a relatively low packet delay budget (PDB) or similar QoS parameters such that the communications are forwarded largely uninterrupted. Other communications, however, which are not as time sensitive, may be associated with a relatively low QoS priority, and thus may be mapped to a QoS flow having a relatively high PDB and similar QoS parameters.

As shown by reference number 420, data packets or the like may be received at the UPF or a similar network controller. As shown by reference number 425, the UPF may map the packets to one of multiple QoS flows 410 according to a QoS priority or the like. The UPF may map the packets to the QoS flows according to certain QoS requirements, such as maximum permissible delay, required data rate, or the like. For example, the most time-sensitive packets may be mapped to a first QoS flow 410 that is associated with a relatively low PDB, a relatively high data rate, or a similar parameter; packets that are less time-sensitive may be mapped to a second QoS flow 410 that is associated with a greater PDB and/or a lower data rate or similar parameter; packets that are even less time-sensitive may be mapped to a third QoS flow 410 that is associated with an even greater PDB and/or an even lower data rate or similar parameter, and so forth. As shown by reference number 430, each packet may also be marked with a QoS flow identifier (QFI, sometimes referred to as a 5QI value) associated with the corresponding QoS flow 410 to assist QoS handling by the base station 110, the UE 102, and/or other network components.

As shown at reference number 435, the base station 110 may receive the packets via the various QoS flows 410 and map each packet to a corresponding radio bearer 415, which may be a signaling radio bearer (SRB) or a data radio bearer (DRB). In some aspects, more than one QoS flow 410 may be mapped to a single radio bearer 415. That is, there may not be a one-to-one correlation between the QoS flows 410 and the radio bearers 415. The UE 120 receives the packets via the radio bearers.

In the uplink (e.g., when sending a transmission from the UE 120 to the base station 110 and ultimately to the core network (e.g., the UPF 405)), the above process is generally performed in reverse. More particularly, as shown by reference number 440, the UE 120 may map packets to be transmitted to QoS flows 410 and/or radio bearers 415. In some aspects, the UE 120 may determine which QoS flow and/or radio bearer to use based at least in part on observing the various QFIs in downlink packets for the PDU session, which provides the UE 120 with information about which packets should be mapped to particular QoS flows and/or radio bearers. In some other aspects, the UE 120 may receive a configuration from the network indicating which QoS flow and/or radio bearer to use for certain packet types, which may be received via RRC signaling or the like. The packets are then transmitted to the base station 110 via the radio bearers 415, and to the UPF via the QoS flows 410, generally in reverse to the process described above.

As indicated above, FIG. 4 is provided as an example. Other examples may differ from what is described with regard to FIG. 4.

Figure 5:
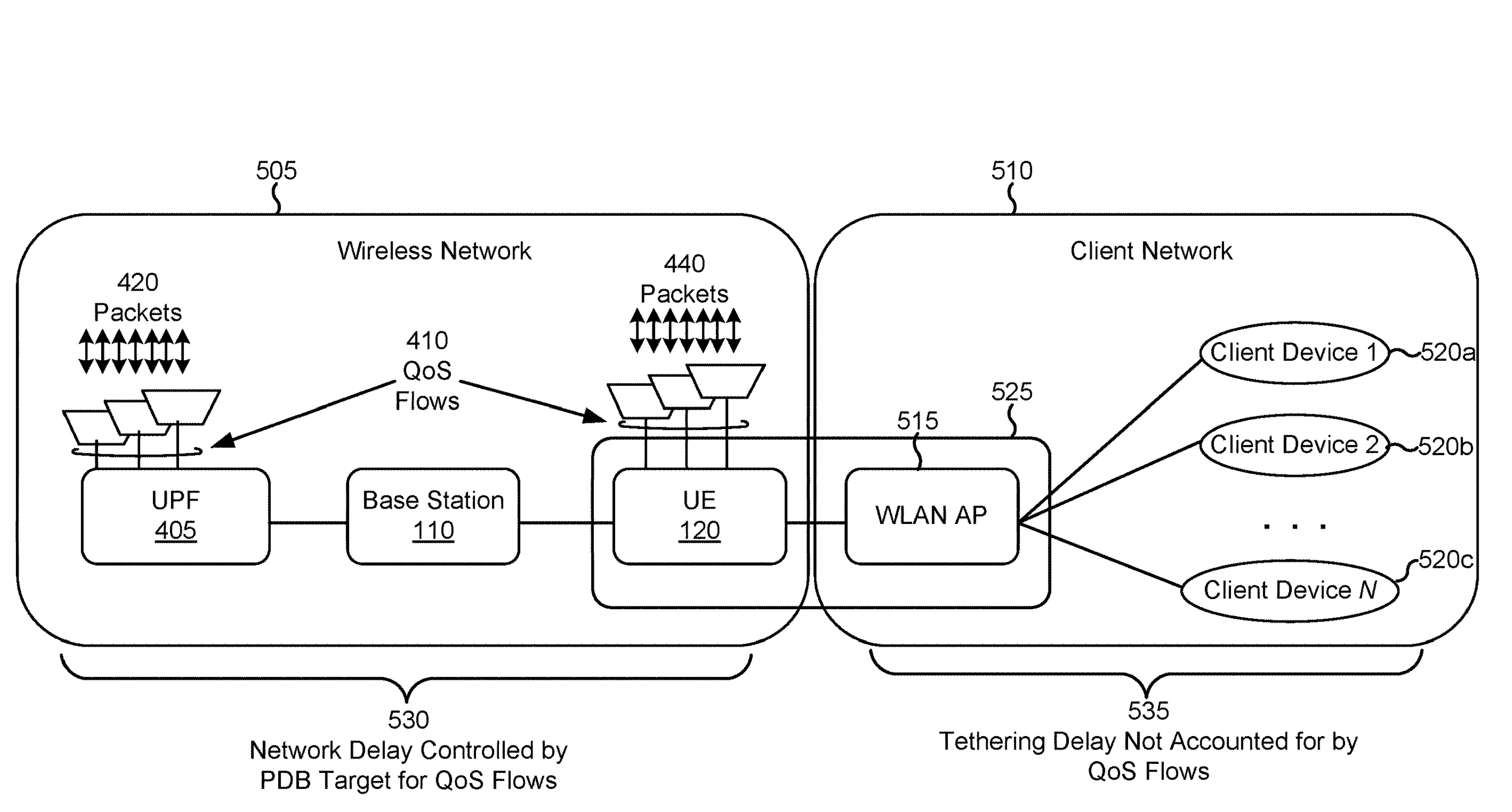
FIG. 5 is a diagram illustrating an example of a PDU session associated with a UE, in accordance with the present disclosure.

FIG. 5 is a diagram illustrating an example 500 of a PDU session associated with a UE, in accordance with the present disclosure.

In some aspects, one or more components of the wireless networks described above (e.g., wireless network 100) may be used to provide wide area connectivity for a client network or the like. For example, FIG. 5 shows a wireless network 505 (sometimes referred to as a 3GPP network) that provides wide area connectivity for a client network 510. More particularly, in some aspects, a UE 120 associated with the wireless network 505 may be in communication with an access point (AP) 515 of the client network 510. The AP 515 may also be in communication with one or more client devices 520 (e.g., client device 1 520*a*, client device 2 520*b*, client device N 520*c*, and so forth), such as by a wired ethernet connection, a wireless local area network (WLAN) connection, or the like. In that regard, in some aspects, the AP 515 may be a WLAN AP, as shown in FIG. 5. Moreover, in some aspects, the UE 120 may be a fixed wireless access (FWA) UE, and/or the UE 120 and the AP 515 may be co-located (e.g., contained within a single network device 525).

In some aspects, the wireless network 505 may account for QoS sensitive services (e.g., services with a strict maximum delay target) by establishing a QoS flow between the UPF 405 and the UE 120 that is associated with a PDB set equal to the maximum delay target of the application, as described in connection with FIG. 4. More particularly, data packets or the like (e.g., the packets described in connection with reference numbers 420 and 440) will experience a certain network delay as they travel from the UPF 405 to the UE 120 and/or from the UE 120 to the UPF 405. As shown by reference number 530, each of the multiple QoS flows may be associated with a different PDB. By selecting a QoS flow with a PDB equal to or less than a maximum delay target for the given packet and/or application, the network ensures that certain QoS benchmarks are maintained (e.g., that the packets are transmitted through the wireless network 505 with a delay equal to or less than a maximum delay target).

However, the QoS mapping features described in connection with FIG. 4 do not consider any delays external to the wireless network 505, such as delays associated with a client network 510 or the like. For example, in FWA UE scenarios and/or other scenarios in which the wireless network 505 provides connectivity to an external network (e.g., the client network 510), data packets (e.g., the packets described in connection with reference numbers 420 and 440) will be further transmitted from the UE 120 to the client network 510 and ultimately one or more client devices 520 via the AP 515. Thus, in addition to a delay experienced within the wireless network 505, the packets will experience further delay as they travel through the client network 510 (e.g., from the UE 120 to the AP 515, and/or from the AP 515 to the client device 520), sometimes referred to herein as a tethering delay. In some examples, because the tethering delay is associated with delays caused outside of a 3GPP wireless network (e.g., wireless network 100), the tethering may be referred to as a "client-network delay" and/or a "non-3GPP delay." As shown by reference number 535, this tethering delay is not accounted for by the corresponding QoS flow. As a result, a packet transmitted to a client device 520 via an FWA UE 120 or the like may experience a delay exceeding a maximum delay target, resulting in untimely packet delivery (e.g., packets arriving at a client device after a maximum delay target), increased latency, and overall inefficient network usage.

Some techniques and apparatuses described herein enable QoS processing that compensates for tethering delays associated with a client network 510 or similar external network for which the wireless network 505 is providing connectivity. For example, in some aspects a UE 120 (which may be an FWA UE) may send a request to a network controller for a tethering delay budget (sometimes referred to as a client-network-delay budget and/or a non-3GPP-delay budget) associated with a tethering delay in the client network 510, and the network controller (e.g., a controller associated with the UPF 405 or other core network function or component, a controller associated with the base station 110, a controller associated with a CU 310, a DU 330, and/or an RU 340, or a controller associated with another network device) may compensate for the tethering delay within the wireless network 505 by selecting an appropriate QoS flow to deliver a packet at a client device 520 within a maximum delay target. More particularly, in some aspects, the network controller may reduce a PDB by the tethering delay budget, and then use a QoS flow associated with a maximum delay that is equal to or less than the PDB reduced by the tethering delay budget in order to compensate for the tethering delay within the wireless network 505 traffic. As a result, the wireless network 505 may deliver packets to a client device within a maximum delay target, thus reducing latency and resulting in more efficient network usage.

As indicated above, FIG. 5 is provided as an example. Other examples may differ from what is described with regard to FIG. 5.

Figure 6:
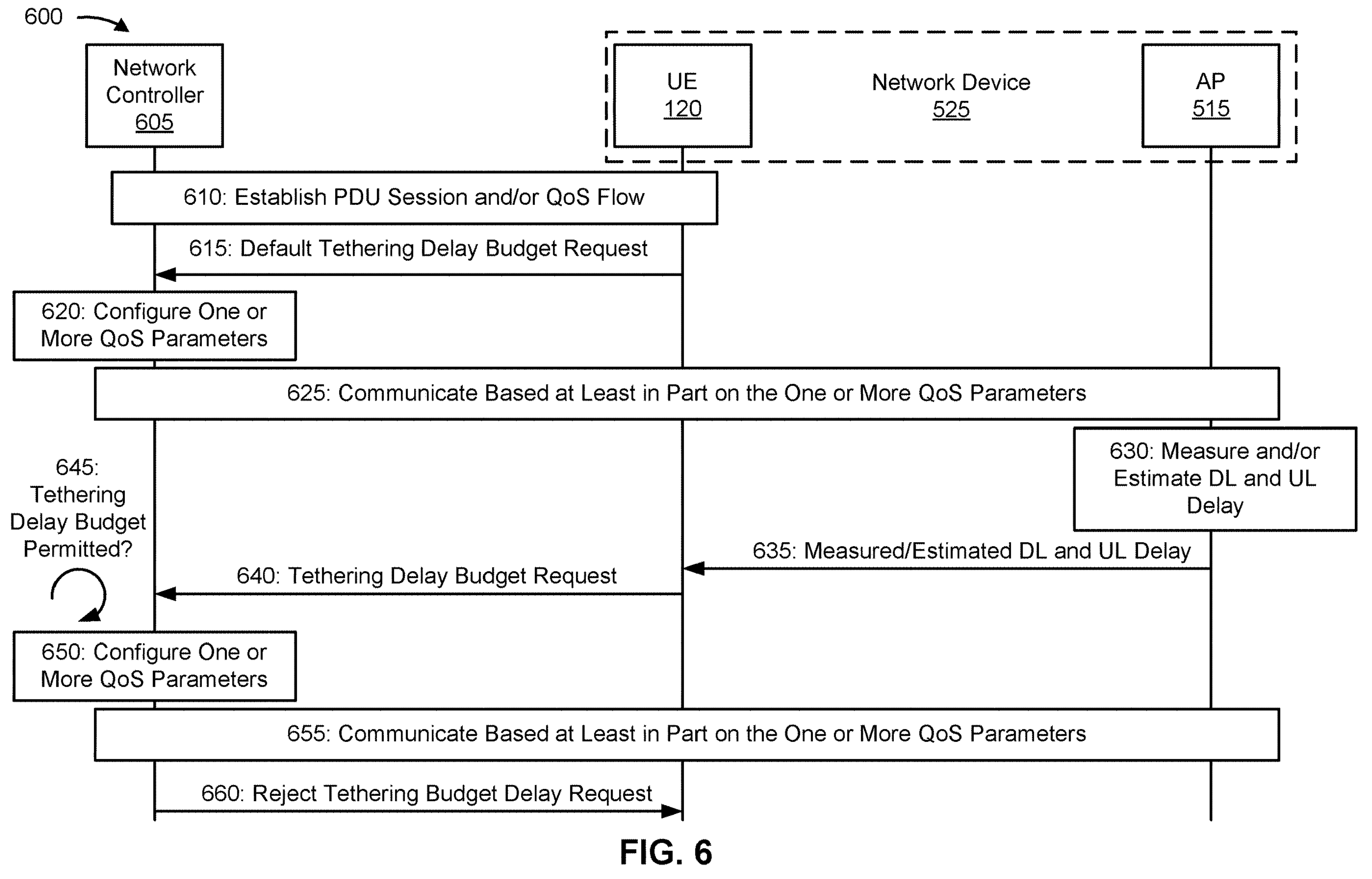
FIG. 6 is a diagram illustrating an example associated with allocating a tethering delay budget for QoS configurations, in accordance with the present disclosure.

FIG. 6 is a diagram illustrating an example 600 associated with allocating a tethering delay budget for QoS configurations, in accordance with the present disclosure. As shown in FIG. 6, a network controller 605, a UE 120, and an AP 515 may communicate with one another. In some aspects, the UE 120 is an FWA UE that provides connectivity to a client network 510, as described in connection with FIG. 5. In some other aspects, the UE 120 is a mobile UE that provides connectivity to a client network 510, such as a smartphone providing connectivity to a gaming device or similar client device 520. Additionally, or alternatively, the AP 515, which forms part of a client network 510, communicates with the network controller 605 via the UE 120, as described in connection with FIGS. 4 and 5. Similarly, the network controller 605 and the UE 120 may communicate with the client network 510 via the AP 515. In some aspects, the network controller 605 may be a controller associated with the core network, such as with the UPF 405 of the core network, a session management function (SMF) of the core network, a policy control function (PCF) of the core network, or a similar core network function. In some other aspects, the network controller 605 may be a controller associated with a base station 110 or other network node such as a CU 310, a DU 330, an RU 340, or a similar network node. Moreover, in some aspects, the AP 515 may be associated with a wired or wireless client network (e.g., client network 510), and, in some aspects, may be a WLAN AP. In some aspects, the UE 120 and the AP 515 may be co-located (e.g., contained within a single network device, such as the network device 525 described in connection with FIG. 5), while in some other aspects the UE 120 and the AP 515 may be non-co-located.

As shown by reference number 610, a PDU session and/or a QoS flow (e.g., the PDU session and/or one or more of the QoS flows described in connection with FIG. 4) may be established between the network controller 605 and the UE 120. As described in connection with FIG. 4, the PDU session may include multiple QoS flows, each associated with a corresponding PDB, used to transmit packets between the core network (e.g., the UPF or similar network function) and the UE 120.

In some aspects, the network controller 605 may receive a tethering delay budget request (e.g., a non-3GPP-delay budget request) from the UE 120, which is a request to adjust a PDB and/or other QoS parameter in order to compensate for a tethering delay (e.g., a non-3GPP delay) in the client network 510. For example, as shown at reference number 615, the network controller 605 may receive, from the UE 120, a default tethering budget delay request. As described in more detail below in connection with reference numbers 630 and 635, after a traffic flow has been established between the wireless network 505 and the client network 510, a tethering delay associated with the client network 510 may be measured and/or estimated by the AP 515, a client device 520, or a similar device. However, prior to an established traffic flow, the AP 515, the client device 520, or another device may not be able to measure and/or estimate the tethering delay. But if the UE 120 waits until the tethering delay can be measured and/or estimated based on traffic flow, the wireless network 505 and the client network 510 may experience unacceptably high end-to-end delays. Accordingly, in some aspects the UE 120 may initially signal to the network controller 605 a default tethering delay budget that applies for purposes of adjusting one or more QoS parameters until a more specific tethering delay budget (e.g., one based at least in part on a measured or estimated tethering delay associated with a traffic flow or the like) can be signaled to the network controller 605. In some aspects, the default tethering delay budget may be based at least in part on a minimum uplink and/or downlink delay needed to transfer a frame with a typical size in the client network 510. Additionally, or alternatively, in some aspects, the default tethering delay budget may be based at least in part on a client device 520 to which the traffic is directed. For example, a first client device 520*a* may be associated with a first default tethering delay budget, a second client device 520*b* may be associated with a second default tethering delay budget, and so forth.

As shown by reference number 620, in aspects employing the default tethering delay budget, the network controller 605 may configure one or more QoS parameters, associated with the wireless network 505, for the QoS flow, wherein the one or more QoS parameters are configured based at least in part on the default tethering delay budget. More particularly, the network controller 605 may adjust a PDB for a QoS flow based at least in part on the default tethering delay budget. In this way, the default tethering delay budget is compensated for when packets are transmitted via the wireless network 505 and the client network 510. More particularly, as shown by reference number 625, the network controller 605, the UE 120, and/or the AP 515 may communicate based at least in part on the one or more QoS parameters. For example, when a PDB for a given QoS flow is reduced by the default tethering delay budget, a packet of data may be transmitted through the wireless network in a shorter amount of time (e.g., within a time frame less than or equal to the PDB less the default tethering delay budget). In this way, the packet can be further transmitted through the client network 510 and arrive at a client device 520 within a maximum delay target, notwithstanding the tethering delays caused by the client network 510. In aspects in which the default tethering delay budget is not employed, prior to any tethering delay budget request being measured, estimated, and/or forwarded to the network controller 605 (as described in more detail in connection with reference numbers 630, 635, and 640) the network controller 605, the UE 120, and/or the AP 515 may communicate in accordance with unadjusted QoS flows (e.g., may communicate without compensating for the tethering delay associated with the client network 510).

In some aspects, rather than using a default tethering delay budget, the UE 120 may request a tethering delay budget based at least in part on channel conditions or the like in the client network 510 (e.g., based at least in part on a measured and/or an estimated client network delay). For example, as shown by reference number 630, the AP 515 may measure and/or estimate downlink and/or uplink delays associated with the client network 510. In some aspects, the AP 515 may be capable of measuring a downlink tethering delay (e.g., a delay associated with packets being transmitted from the AP 515 to a client device 520), but may be incapable of measuring an uplink tethering delay (e.g., a delay associated with packets being transmitted from a client device 520 to the AP 515). In such aspects, the AP 515 may measure the downlink tethering delay and may estimate the uplink tethering delay. The AP 515 may estimate the uplink tethering delay based at least in part on an experienced channel load or the like. For example, when the AP 515 is a WLAN AP, the uplink tethering delay may be estimated based at least in part on the experienced WLAN channel load. In some aspects, one or more of the client devices 520 may be capable of measuring the uplink tethering delay. In such aspects, the one or more of the client devices 520 may measure the uplink tethering delay and signal an indication of the measured uplink tethering delay to the AP 515. As shown by reference number 635, the AP 515 may then transmit an indication of the measured and/or estimated downlink and uplink delays associated with the client network to the UE 120.

In some aspects, one or more of the client devices 520 may measure and/or estimate a tethering delay associated with the client network 510 and signal an indication of the delay directly to the network (e.g., instead of, or in addition to, signaling an indication of the tethering delay to the AP 515). For example, the one or more client devices 520 may be capable of measuring the uplink tethering delay (e.g., a delay associated with packets being transmitted from the client device 520 to the AP 515), but may be incapable of measuring the downlink tethering delay (e.g., a delay associated with packets being transmitted from the AP 515 to the client device 520). Thus, one or more client devices 520 may measure the uplink tethering delay and/or estimate the downlink tethering delay based on experienced channel load or the like. Additionally, or alternatively, the AP 515 may measure the downlink tethering delay (as described above) and signal the measurement to the one or more client devices 520. The one or more client devices 520 may then signal an indication of the measured and/or estimated tethering delays to the wireless network 505. For example, the one or more client devices 520 may signal the indication of the measured and/or estimated tethering delays using a user-plane protocol terminated in the UPF 405. In some aspects, the UPF 405 may forward the indication of the measured and/or estimated tethering delays to another network node or component, such as the SMF, PCF, or similar network function. More particularly, the UPF may forward the indication of the measured and/or estimated tethering delays to the SMF, and the SMF may forward the indication of the measured and/or estimated tethering delays to the PCF.

As shown by reference number 640, the UE 120 may request a tethering delay budget from the network controller 605. In this case, the tethering delay budget may be based at least in part on a tethering delay associated with the client network 510, and, more particularly, may be based at least in part on a measured and/or estimated downlink delay and uplink delay associated with the client network 510 and signaled to the UE 120 (as shown by reference number 635).

In some aspects, the network controller 605 may be associated with the core network (e.g., the UPF 405, the SMF, the PCF, or the like), and thus the tethering delay budget request may be transmitted to the network controller 605 via one or more intermediary network nodes, such as a base station 110, a CU 310, a DU 330, an RU 340, or a similar network node. In some other aspects, the network controller 605 may be associated with an access node (e.g., a base station 110, a CU 310, a DU 330, an RU 340, or a similar network node), and thus the UE 120 may transmit the tethering delay budget request to the network controller 605 directly (via the Uu interface or the like) or else indirectly via one or more intermediary network nodes. Moreover, in aspects in which the network controller 605 is associated with an access node (e.g., a base station 110, a CU 310, a DU 330, an RU 340, or a similar network node), the UE 120 may signal the requested tethering delay budget to the network controller 605 via one of RRC signaling or MAC control element (MAC-CE) signaling. In some aspects, the UE 120 may update the tethering delay budget request (or multiple tethering delay budget requests) and/or may transmit additional tethering delay budget requests as channel conditions change at the client network 510 or the like. For example, the UE 120 may periodically receive from the AP 515 updated measured and/or estimated downlink and uplink delays associated with the client network 510, and thus the UE 120 may request one or more updated and/or an additional tethering delay budgets, accordingly.

In some aspects, the tethering delay budget request indicated by reference number 640 may include more than one requested tethering delay budget. For example, the request may include a list of supported tethering delay classes, which may include multiple tethering delay budgets corresponding to different access categories. That is, a first tethering delay budget may correspond to a first access category, such as emergency calls, or the like; a second tethering delay budget may correspond to a second access category, such as video telephony, or the like; a third tethering delay budget may correspond to a third access category, such as voice telephony, or the like, and so forth. In some aspects, in the signaling shown by reference number 640, the UE 120 may further indicate a preferred one of the multiple tethering delay budgets to be used for a particular traffic flow.

As shown by reference number 645, the network controller 605 may determine whether the requested tethering delay budget is permitted. For example, in some aspects, whether a particular requested tethering delay budget is permitted may be based at least in part on a subscription status associated with the UE 120 and/or a subscription status associated with a particular PDU session. The subscription may indicate whether or not the UE 120 and/or the PDU session is permitted to include tethering delay budget adjustments, and, if so, a permitted range of tethering delay budget adjustments, or the like. In some aspects, a subscription associated with a unified data management (UDM) function at the core network may include a parameter (sometimes referred to as an allowed tethering delay budget parameter) indicating whether tethering delay budget adjustments are permitted for the UE 120, for the particular PDU session, for a particular data packet, or the like. For example, in some aspects, the subscription may be associated with a data network name (DNN) identifier associated with the UE 120 and/or the PDU session. Additionally, or alternatively, the subscription may be associated with a single network slice selection assistance information (S-NSSAI) identifier associated with the UE 120 and/or the PDU session. In some aspects, the network controller 605 may receive an indication of the subscription parameter and determine, based at least in part on the indication, if the subscription permits tethering delay budget adjustments. In some other aspects, the network controller 605 may receive, from another network node or device (e.g., the UDM), an indication of whether the subscription permits tethering delay budget adjustments. For example, if the subscription indicates that a particular tethering delay budget is permitted and/or within an acceptable range of permitted tethering delay budgets, the network controller 605 may receive an indication to grant the request for the tethering delay budget.

As shown by reference number 650, if the tethering delay budget is permitted (e.g., if the requested budget is allowed according to the UDM subscription or the like), the network may configure one or more QoS parameters for the QoS flow based at least in part on the tethering delay budget. For example, the network controller 605 may adjust a PDB based at least in part on the requested tethering delay budget. More particularly, if the tethering delay budget is granted, the network controller 605 may reduce a PDB for the related QoS flow by the received tethering delay budget to compensate for the tethering delay within the wireless network 505. Put another way, the network controller 605 configures the one or more QoS parameters such that the packets are transmitted through the wireless network 505 with a delay equal to or less than a maximum delay target for the packet less the tethering delay associated with the client network 510. In this way, the packets may be transmitted end-to-end (e.g., through the wireless network 505 and the client network 510) within the maximum delay target. In aspects in which the UE 120 transmitted a list of supported tethering delay classes including multiple tethering delay budgets corresponding to different access categories, at the configuration indicated by reference number 650, the network controller 605 may select a tethering delay budget allocated to the client network 510 and configure one or more QoS parameters (e.g., PDB or the like) for the traffic flow based at least in part on the selected tethering delay budget. Moreover, in aspects in which the UE 120 further indicated a preferred one of the multiple tethering delay budgets to be used for a particular traffic flow, the network controller 605 may select a tethering delay budget based at least in part on the indication of the preferred tethering delay budget.

In aspects in which the network controller 605 is associated with an access node (e.g., a base station 110, a CU 310, a DU 330, an RU 340, or a similar network node), configuring the one or more QoS parameters may include configuring an access node specific parameter, such as an access node portion of the PDB (e.g., AN-PDB). For example, the PDB may include a core network portion of the PDB (e.g., CN-PDB) and the AN-PDB. That is, the PDB for the wireless network 505 may be equal to the sum of the CN-PDB and the AN-PDB (e.g., PDB=CN-PDB+AN-PDB). Thus, in aspects in which the network controller 605 is associated with an access node, at the configuration shown by reference number 650, the network controller 605 may recalculate and/or configure a corresponding AN-PDB based at least in part on the requested tethering delay budget received from the UE 120. More particularly, the network controller 605 may configure the AN-PDB as the PDB (as received from the core network), less the CN-PDB, and less the tethering delay budget (e.g., AN-PDB=PDB−CN-PDB−requested tethering delay budget).

As shown by reference number 655, the network controller 605, the UE 120, and/or the AP 515 may communicate based at least in part on the one or more QoS parameters. In some aspects, the communication shown at reference number 655 may include the network controller 605 signaling to one or more network devices (e.g., the UE 120) the one or more QoS parameters (e.g., the adjusted PDB or the like). Moreover, the communication shown at reference number 655 may include the network controller 605 transmitting, to the UE 120, a communication based at least in part on the one or more QoS parameters (e.g., using the QoS flow associated with the configured one or more QoS parameters), and the UE 120 transmitting, to the AP 515, the communication for forwarding to a client device via the client network 510.

Alternatively, in some aspects, the network controller 605 may reject the tethering delay budget request. For example, the tethering delay budget may not be permitted according to the UDM subscription or the like. Additionally, or alternatively, the network controller 605 may not support the requested tethering delay budget. For example, the network controller 605 may determine that a PDB reduced by the requested tethering delay budget may not be achievable given network and/or channel conditions or the like. In such aspects, the network controller 605 may reject the requested tethering delay budget, as shown by reference number 660. Accordingly, the network controller 605, the UE 102, and/or the AP 515 may communicate using a QoS flow associated with a PDB or other QoS parameter that is not adjusted according to a requested tethering delay budget.

As indicated above, FIG. 6 is provided as an example. Other examples may differ from what is described with respect to FIG. 6.

Figure 7:
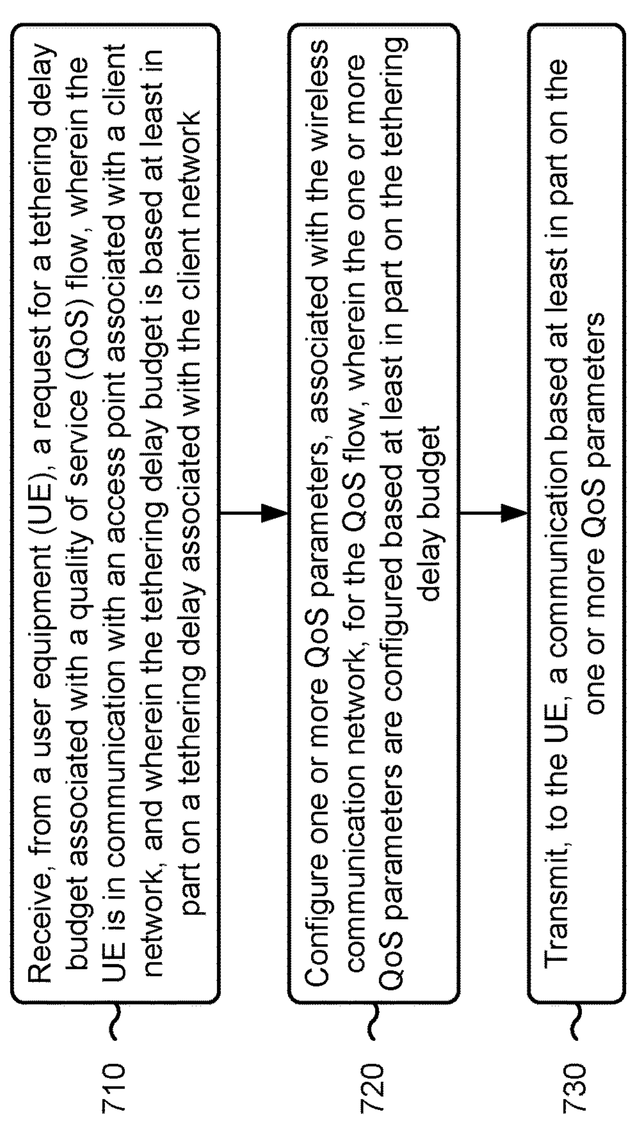
FIG. 7 is a diagram illustrating an example process performed, for example, by a network controller, in accordance with the present disclosure.

FIG. 7 is a diagram illustrating an example process 700 performed, for example, by a network controller, in accordance with the present disclosure. Example process 700 is an example where the network controller (e.g., network controller 130 or other controller associated with a core network function such as a UPF, SMF, or PCF, a controller associated with a base station 110, a CU 310, a DU 330, or an RU 340, or a similar network controller) performs operations associated with allocating a tethering delay budget for QoS configurations.

As shown in FIG. 7, in some aspects, process 700 may include receiving, from a UE, a request for a tethering delay budget associated with a QoS flow, wherein the UE is in communication with an access point associated with a client network, and wherein the tethering delay budget is based at least in part on a tethering delay associated with the client network (block 710). For example, the network controller (e.g., using communication manager 908 and/or reception component 902, depicted in FIG. 9) may receive, from a UE, a request for a tethering delay budget associated with a QoS flow, wherein the UE is in communication with an access point associated with a client network, and wherein the tethering delay budget is based at least in part on a tethering delay associated with the client network, as described above.

As further shown in FIG. 7, in some aspects, process 700 may include configuring one or more QoS parameters, associated with the wireless communication network, for the QoS flow, wherein the one or more QoS parameters are configured based at least in part on the tethering delay budget (block 720). For example, the network controller (e.g., using communication manager 908 and/or configuration component 910, depicted in FIG. 9) may configure one or more QoS parameters, associated with the wireless communication network, for the QoS flow, wherein the one or more QoS parameters are configured based at least in part on the tethering delay budget, as described above.

As further shown in FIG. 7, in some aspects, process 700 may include transmitting, to the UE, a communication based at least in part on the one or more QoS parameters (block 730). For example, the network controller (e.g., using communication manager 908 and/or transmission component 904, depicted in FIG. 9) may transmit, to the UE, a communication based at least in part on the one or more QoS parameters, as described above.

Process 700 may include additional aspects, such as any single aspect or any combination of aspects described below and/or in connection with one or more other processes described elsewhere herein.

In a first aspect, the UE is an FWA UE.

In a second aspect, alone or in combination with the first aspect, the access point is a WLAN access point.

In a third aspect, alone or in combination with one or more of the first and second aspects, the UE and the access point are co-located.

In a fourth aspect, alone or in combination with one or more of the first through third aspects, the tethering delay associated with the client network is based at least in part on an uplink tethering delay and a downlink tethering delay.

In a fifth aspect, alone or in combination with one or more of the first through fourth aspects, the downlink tethering delay is based at least in part on a measurement performed by the access point, and the uplink tethering delay is based at least in part on an estimation associated with a channel load performed by the access point.

In a sixth aspect, alone or in combination with one or more of the first through fifth aspects, the downlink tethering delay is based at least in part on a measurement performed by the access point, and the uplink tethering delay is based at least in part on a measurement performed by a client device associated with the client network and transmitted to the access point by the client device.

In a seventh aspect, alone or in combination with one or more of the first through sixth aspects, the network controller is associated with one of an SMF of the wireless communication network or a PCF of the wireless communication network.

In an eighth aspect, alone or in combination with one or more of the first through seventh aspects, process 700 includes determining whether to grant the request for the tethering delay budget based at least in part on a subscription status of the UE.

In a ninth aspect, alone or in combination with one or more of the first through eighth aspects, configuring the one or more QoS parameters for the QoS flow is based at least in part on reducing a PDB by the tethering delay budget.

In a tenth aspect, alone or in combination with one or more of the first through ninth aspects, process 700 includes receiving, from the UE, a request for another tethering delay budget associated with the QoS flow, reducing a PDB by the other tethering delay budget, and rejecting the request for the other tethering delay budget based at least in part on determining that the wireless communication network cannot support the PDB reduced by the other tethering delay budget.

In an eleventh aspect, alone or in combination with one or more of the first through tenth aspects, the tethering delay budget is based at least in part on a default tethering delay budget associated with at least one of the client network or a client device.

In a twelfth aspect, alone or in combination with one or more of the first through eleventh aspects, the request for the tethering delay budget includes an indication of a first tethering delay budget associated with a first access category and a second tethering delay budget associated with a second access category that is different from the first access category.

In a thirteenth aspect, alone or in combination with one or more of the first through twelfth aspects, process 700 includes receiving, from the UE, an indication of a preferred tethering delay budget, with the preferred tethering delay budget being one of the first tethering delay budget and the second tethering delay budget, and the one or more QoS parameters being configured based at least in part on the indication of the preferred tethering delay budget.

In a fourteenth aspect, alone or in combination with one or more of the first through thirteenth aspects, the network controller is associated with a network node of the wireless communication network.

In a fifteenth aspect, alone or in combination with one or more of the first through fourteenth aspects, the request for the tethering delay budget is received via one of an RRC message or a MAC-CE message.

In a sixteenth aspect, alone or in combination with one or more of the first through fifteenth aspects, configuring the one or more QoS parameters for the QoS flow is based at least in part on reducing an AN-PDB by the tethering delay budget.

In a seventeenth aspect, alone or in combination with one or more of the first through sixteenth aspects, process 700 includes receiving a configuration of at least one of a subscription parameter indicating whether the network controller is permitted to grant the request for the tethering delay budget, an indication to grant the request for the tethering delay budget, or a range of permitted tethering delay budgets.

In an eighteenth aspect, alone or in combination with one or more of the first through seventeenth aspects, process 700 includes receiving, from a client device associated with the client network, an indication of the tethering delay associated with the client network.

In a nineteenth aspect, alone or in combination with one or more of the first through eighteenth aspects, the tethering delay associated with the client network is based at least in part on an uplink tethering delay and a downlink tethering delay, the uplink tethering delay is based at least in part on a measurement performed by the client device, and the downlink tethering delay is based at least in part on an estimation performed by the client device.

In a twentieth aspect, alone or in combination with one or more of the first through nineteenth aspects, the tethering delay associated with the client network is based at least in part on an uplink tethering delay and a downlink tethering delay, with the uplink tethering being based at least in part on a measurement performed by the client device, and the downlink tethering delay being based at least in part on a measurement performed by the access point.

In a twenty-first aspect, alone or in combination with one or more of the first through twentieth aspects, the indication of the tethering delay is received via a UPF of the wireless communication network.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
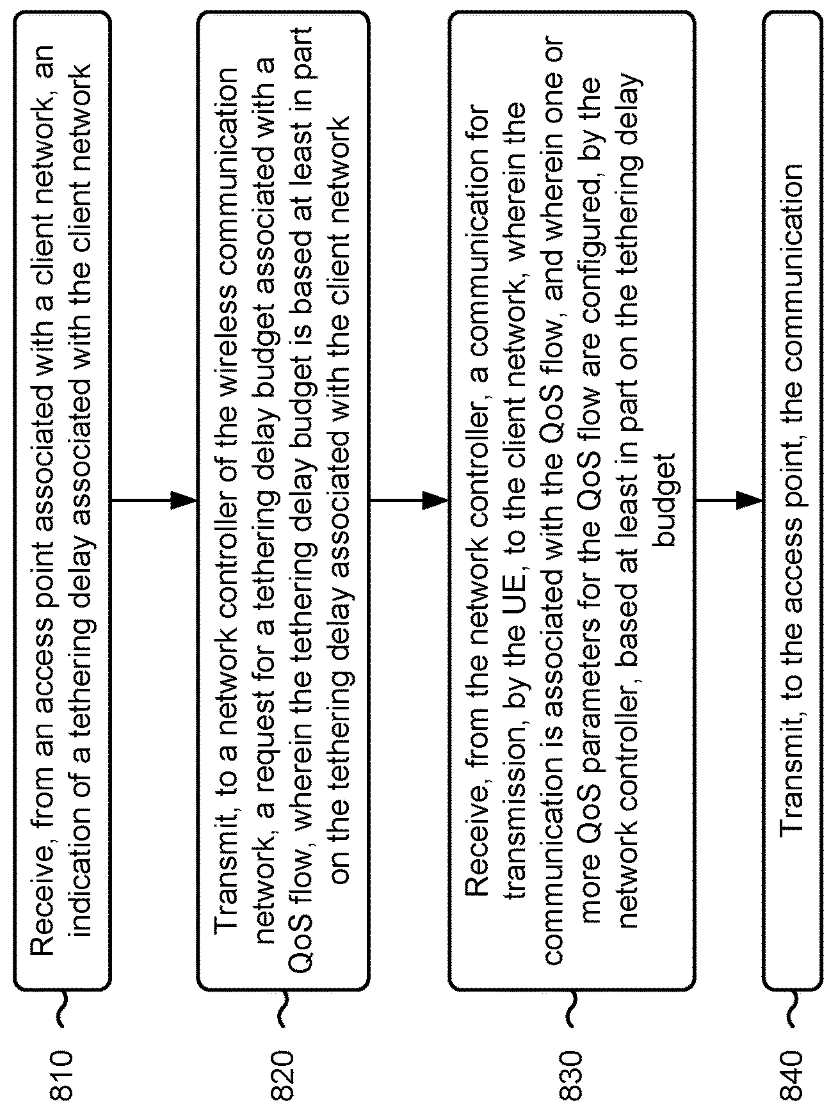
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with allocating a tethering delay budget for QoS configurations.

As shown in FIG. 8, in some aspects, process 800 may include receiving, from an access point associated with a client network, an indication of a tethering delay associated with the client network (block 810). For example, the UE (e.g., using communication manager 140 and/or reception component 1002, depicted in FIG. 10) may receive, from an access point associated with a client network, an indication of a tethering delay associated with the client network, as described above.

As further shown in FIG. 8, in some aspects, process 800 may include transmitting, to a network controller of the wireless communication network, a request for a tethering delay budget associated with a QoS flow, wherein the tethering delay budget is based at least in part on the tethering delay associated with the client network (block 820). For example, the UE (e.g., using communication manager 140 and/or transmission component 1004, depicted in FIG. 10) may transmit, to a network controller of the wireless communication network, a request for a tethering delay budget associated with a QoS flow, wherein the tethering delay budget is based at least in part on the tethering delay associated with the client network, as described above.

As further shown in FIG. 8, in some aspects, process 800 may include receiving, from the network controller, a communication associated with the QoS flow, wherein one or more QoS parameters for the QoS flow are configured, by the network controller, based at least in part on the tethering delay budget (block 830). For example, the UE (e.g., using communication manager 140 and/or reception component 1002, depicted in FIG. 10) may receive, from the network controller, a communication associated with the QoS flow, wherein one or more QoS parameters for the QoS flow are configured, by the network controller, based at least in part on the tethering delay budget, as described above.

As further shown in FIG. 8, in some aspects, process 800 may include transmitting, to the access point, the communication (block 840). For example, the UE (e.g., using communication manager 140 and/or transmission component 1004, depicted in FIG. 10) may transmit, to the access point, the communication, as described above.

Process 800 may include additional aspects, such as any single aspect or any combination of aspects described below and/or in connection with one or more other processes described elsewhere herein.

In a first aspect, the UE is an FWA UE.

In a second aspect, alone or in combination with the first aspect, the access point is a WLAN access point.

In a third aspect, alone or in combination with one or more of the first and second aspects, the UE and the access point are co-located.

In a fourth aspect, alone or in combination with one or more of the first through third aspects, the tethering delay associated with the client network is based at least in part on an uplink tethering delay and a downlink tethering delay.

In a fifth aspect, alone or in combination with one or more of the first through fourth aspects, the downlink tethering delay is based at least in part on a measurement performed by the access point, and the uplink tethering delay is based at least in part on an estimation associated with a channel load performed by the access point.

In a sixth aspect, alone or in combination with one or more of the first through fifth aspects, the downlink tethering delay is based at least in part on a measurement performed by the access point, and the uplink tethering delay is based at least in part on a measurement performed by a client device associated with the client network and transmitted to the access point by the client device.

In a seventh aspect, alone or in combination with one or more of the first through sixth aspects, the network controller is associated with one of an SMF of the wireless communication network or a PCF of the wireless communication network.

In an eighth aspect, alone or in combination with one or more of the first through seventh aspects, the configuration of the one or more QoS parameters for the QoS flow is based at least in part on a determination of whether to grant the request for the tethering delay budget based at least in part on a subscription status of the UE.

In a ninth aspect, alone or in combination with one or more of the first through eighth aspects, the configuration of one or more QoS parameters for the QoS flow is based at least in part on reducing a PDB by the tethering delay budget.

In a tenth aspect, alone or in combination with one or more of the first through ninth aspects, process 800 includes transmitting, to the network controller, a request for another tethering delay budget associated with the QoS flow, and receiving, from the network controller, a rejection of the request for the other tethering delay budget based at least in part on a determination that the wireless communication network cannot support a PDB reduced by the other tethering delay budget.

In an eleventh aspect, alone or in combination with one or more of the first through tenth aspects, the tethering delay budget is based at least in part on a default tethering delay budget associated with at least one of the client network or a client device.

In a twelfth aspect, alone or in combination with one or more of the first through eleventh aspects, the request for the tethering delay budget includes an indication of a first tethering delay budget associated with a first access category and a second tethering delay budget associated with a second access category that is different from the first access category.

In a thirteenth aspect, alone or in combination with one or more of the first through twelfth aspects, process 800 includes transmitting, to the network controller, an indication of a preferred tethering delay budget, with the preferred tethering delay budget being one of the first tethering delay budget and the second tethering delay budget, and the one or more QoS parameters being configured based at least in part on the indication of the preferred tethering delay budget.

In a fourteenth aspect, alone or in combination with one or more of the first through thirteenth aspects, the network controller is associated with a network node of the wireless communication network.

In a fifteenth aspect, alone or in combination with one or more of the first through fourteenth aspects, the request for the tethering delay budget is transmitted via one of an RRC message or a MAC-CE message.

In a sixteenth aspect, alone or in combination with one or more of the first through fifteenth aspects, the configuration of the one or more QoS parameters for the QoS flow is based at least in part on reducing an AN-PDB by the tethering delay budget.

In a seventeenth aspect, alone or in combination with one or more of the first through sixteenth aspects, the configuration of one or more QoS parameters for the QoS flow is based at least in part on the network controller receiving a configuration of at least one of a subscription parameter indicating whether the network controller is permitted to grant the request for the tethering delay budget, an indication to grant the request for the tethering delay budget, or a range of permitted tethering delay budgets.

In an eighteenth aspect, alone or in combination with one or more of the first through seventeenth aspects, an indication of the tethering delay is received by the network controller from a client device associated with the client network.

In a nineteenth aspect, alone or in combination with one or more of the first through eighteenth aspects, the tethering delay associated with the client network is based at least in part on an uplink tethering delay and a downlink tethering delay, the uplink tethering delay is based at least in part on a measurement performed by the client device, and the downlink tethering delay is based at least in part on an estimation performed by the client device.

In a twentieth aspect, alone or in combination with one or more of the first through nineteenth aspects, the tethering delay associated with the client network is based at least in part on an uplink tethering delay and a downlink tethering delay, the uplink tethering delay is based at least in part on a measurement performed by the client device, and the downlink tethering delay is based at least in part on a measurement performed by the access point.

In a twenty-first aspect, alone or in combination with one or more of the first through twentieth aspects, the network controller receives the indication of the tethering delay via a UPF of the wireless communication network.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
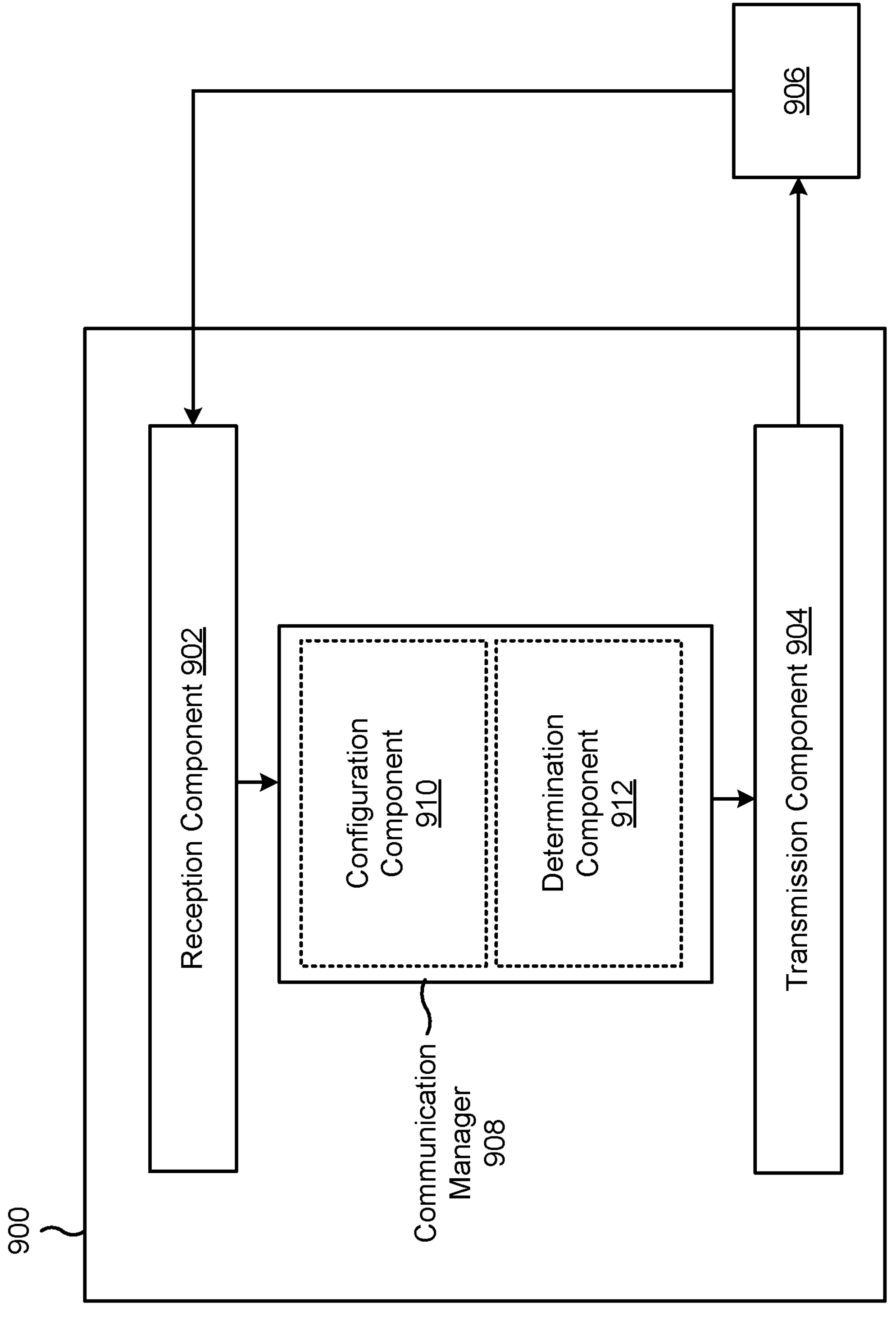
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network controller (e.g., network controller 130 or other controller associated with a core network function such as a UPF, SMF, or PCF, a controller associated with a base station 110, a CU 310, a DU 330, or an RU 340, or a similar network controller), or a network controller may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908. The communication manager 908 may include the communication manager 150 or may be included in the communication manager 150. The communication manager 908 may perform one or more operations described in connection with the communication manager 150. The communication manager 908 may be associated with one or more devices of a disaggregated RAN (e.g., O-RAN) or an aggregated RAN. The communication manager 908 may include one or more of a configuration component 910 or a determination component 912, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station 110 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network controller described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network controller described in connection with FIG. 2. In some aspects, the transmission component 904 may be co-located with the reception component 902 in a transceiver.

The reception component 902 may receive, from a UE, a request for a tethering delay budget associated with a QoS flow, wherein the UE is in communication with an access point associated with a client network, and wherein the tethering delay budget is based at least in part on a tethering delay associated with the client network. The configuration component 910 may configure one or more QoS parameters, associated with the wireless communication network, for the QoS flow, wherein the one or more QoS parameters are configured based at least in part on the tethering delay budget. The transmission component 904 may transmit, to the UE, a communication based at least in part on the one or more QoS parameters.

The determination component 912 may determine whether to grant the request for the tethering delay budget based at least in part on a subscription status of the UE.

The reception component 902 may receive, from the UE, a request for another tethering delay budget associated with the QoS flow.

The configuration component 910 may reduce a PDB by the other tethering delay budget.

The configuration component 910 and/or the determination component 912 may reject the request for the other tethering delay budget based at least in part on determining that the wireless communication network cannot support the PDB reduced by the other tethering delay budget.

The reception component 902 may receive, from the UE, an indication of a preferred tethering delay budget, wherein the preferred tethering delay budget is one of the first tethering delay budget and the second tethering delay budget, and wherein the one or more QoS parameters are configured based at least in part on the indication of the preferred tethering delay budget.

The reception component 902 may receive a configuration of at least one of a subscription parameter indicating whether the network controller is permitted to grant the request for the tethering delay budget, an indication to grant the request for the tethering delay budget, or a range of permitted tethering delay budgets.

The reception component 902 may receive, from a client device associated with the client network, an indication of the tethering delay associated with the client network.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
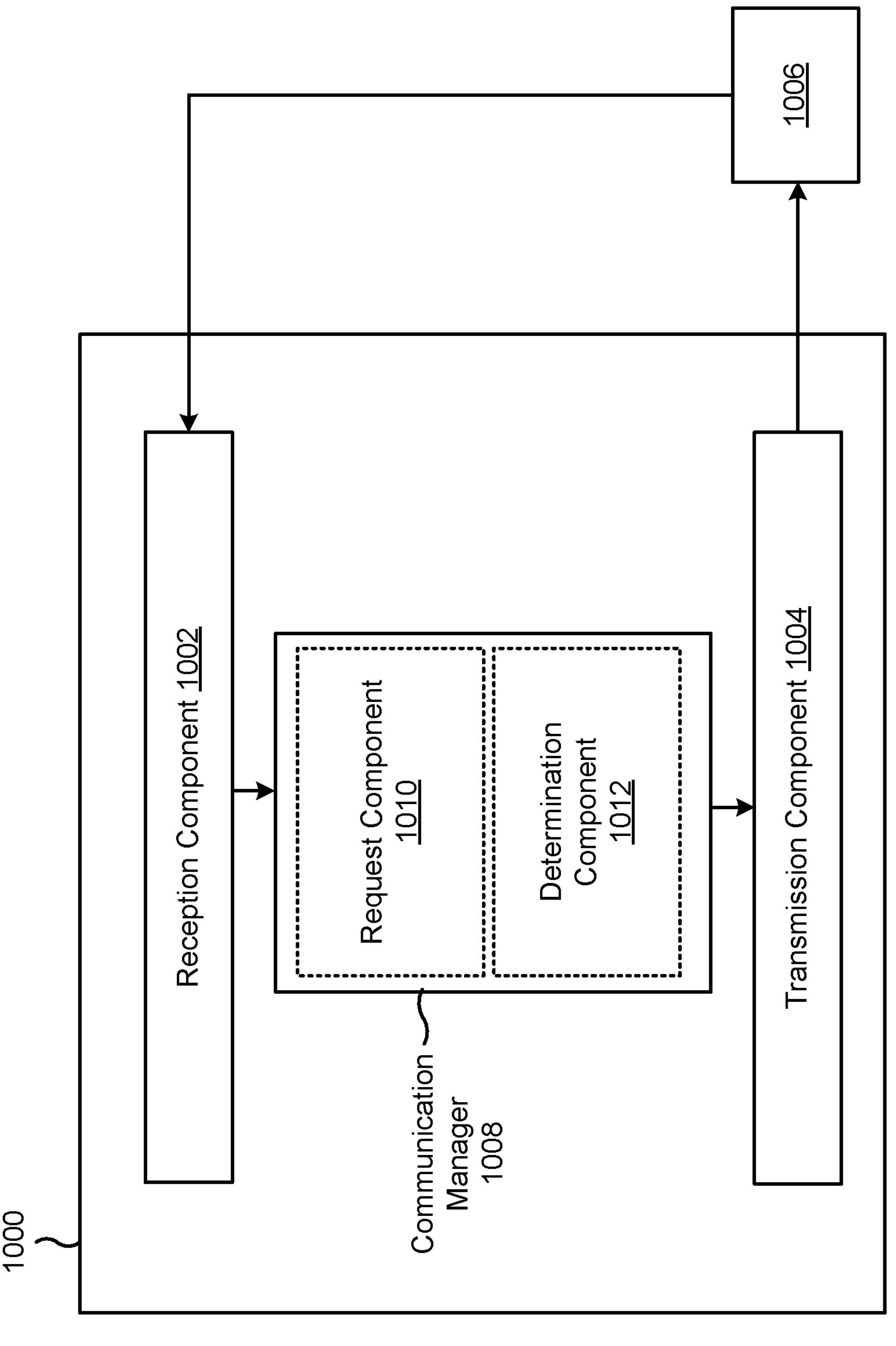
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008 (e.g., the communication manager 140). The communication manager 140 may include one or more of a request component 1010, or a determination component 1012, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from an access point associated with a client network, an indication of a tethering delay associated with the client network. The transmission component 1004, the request component 1010, and/or the determination component 1012 may transmit, to a network controller of the wireless communication network, a request for a tethering delay budget associated with a QoS flow, wherein the tethering delay budget is based at least in part on the tethering delay associated with the client network. The reception component 1002 may receive, from the network controller, a communication associated with the QoS flow, wherein one or more QoS parameters for the QoS flow are configured, by the network controller, based at least in part on the tethering delay budget. The transmission component 1004 may transmit, to the access point, the communication.

The transmission component 1004, the request component 1010, and/or the determination component 1012 may transmit, to the network controller, a request for another tethering delay budget associated with the QoS flow.

The reception component 1002 may receive, from the network controller, a rejection of the request for the other tethering delay budget based at least in part on a determination that the wireless communication network cannot support a PDB reduced by the other tethering delay budget.

The transmission component 1004, the request component 1010, and/or the determination component 1012 may transmit, to the network controller, an indication of a preferred tethering delay budget, wherein the preferred tethering delay budget is one of the first tethering delay budget and the second tethering delay budget, and wherein the one or more QoS parameters are configured based at least in part on the indication of the preferred tethering delay budget.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a network controller of a wireless communication network, comprising: receiving, from a UE, a request for a tethering delay budget associated with a QoS flow, wherein the UE is in communication with an access point associated with a client network, and wherein the tethering delay budget is based at least in part on a tethering delay associated with the client network; configuring one or more QoS parameters, associated with the wireless communication network, for the QoS flow, wherein the one or more QoS parameters are configured based at least in part on the tethering delay budget; and transmitting, to the UE, a communication based at least in part on the one or more QoS parameters.

Aspect 2: The method of Aspect 1, wherein the UE is an FWA UE.

Aspect 3: The method of any of Aspects 1-2, wherein the access point is a WLAN access point.

Aspect 4: The method of any of Aspects 1-3, wherein the UE and the access point are co-located.

Aspect 5: The method of any of Aspects 1-4, wherein the tethering delay associated with the client network is based at least in part on an uplink tethering delay and a downlink tethering delay.

Aspect 6: The method of Aspect 5, wherein the downlink tethering delay is based at least in part on a measurement performed by the access point, and wherein the uplink tethering delay is based at least in part on an estimation associated with a channel load performed by the access point.

Aspect 7: The method of Aspect 5, wherein the downlink tethering delay is based at least in part on a measurement performed by the access point, and wherein the uplink tethering delay is based at least in part on a measurement performed by a client device associated with the client network and transmitted to the access point by the client device.

Aspect 8: The method of any of Aspects 1-7, wherein the network controller is associated with one of an SMF of the wireless communication network or a PCF of the wireless communication network.

Aspect 9: The method of any of Aspects 1-8, further comprising determining whether to grant the request for the tethering delay budget based at least in part on a subscription status of the UE.

Aspect 10: The method of any of Aspects 1-9, wherein configuring the one or more QoS parameters for the QoS flow is based at least in part on reducing a PDB by the tethering delay budget.

Aspect 11: The method of any of Aspects 1-10, further comprising: receiving, from the UE, a request for another tethering delay budget associated with the QoS flow; reducing a PDB by the other tethering delay budget; and rejecting the request for the other tethering delay budget based at least in part on determining that the wireless communication network cannot support the PDB reduced by the other tethering delay budget.

Aspect 12: The method of any of Aspects 1-11, wherein the tethering delay budget is based at least in part on a default tethering delay budget associated with at least one of the client network or a client device.

Aspect 13: The method of Aspects 1-12, wherein the request for the tethering delay budget includes an indication of a first tethering delay budget associated with a first access category and a second tethering delay budget associated with a second access category that is different from the first access category.

Aspect 14: The method of Aspect 13, further comprising receiving, from the UE, an indication of a preferred tethering delay budget, wherein the preferred tethering delay budget is one of the first tethering delay budget and the second tethering delay budget, and wherein the one or more QoS parameters are configured based at least in part on the indication of the preferred tethering delay budget.

Aspect 15: The method of any of Aspects 1-14, wherein the network controller is associated with a network node of the wireless communication network.

Aspect 16: The method of Aspect 15, wherein the request for the tethering delay budget is received via one of an RRC message or a MAC-CE message.

Aspect 17: The method of Aspect 15, wherein configuring the one or more QoS parameters for the QoS flow is based at least in part on reducing an AN-PDB by the tethering delay budget.

Aspect 18: The method of Aspect 15, further comprising receiving a configuration of at least one of a subscription parameter indicating whether the network controller is permitted to grant the request for the tethering delay budget, an indication to grant the request for the tethering delay budget, or a range of permitted tethering delay budgets.

Aspect 19: The method of any of Aspects 1-18, further comprising receiving, from a client device associated with the client network, an indication of the tethering delay associated with the client network.

Aspect 20: The method of Aspect 19, wherein the tethering delay associated with the client network is based at least in part on an uplink tethering delay and a downlink tethering delay, wherein the uplink tethering delay is based at least in part on a measurement performed by the client device, and wherein the downlink tethering delay is based at least in part on an estimation performed by the client device.

Aspect 21: The method of Aspect 19, wherein the tethering delay associated with the client network is based at least in part on an uplink tethering delay and a downlink tethering delay, wherein the uplink tethering delay is based at least in part on a measurement performed by the client device, and wherein the downlink tethering delay is based at least in part on a measurement performed by the access point.

Aspect 22: The method of Aspect 19, wherein the indication of the tethering delay is received via a UPF of the wireless communication network.

Aspect 23: A method of wireless communication performed by a UE associated with a wireless communication network, comprising: receiving, from an access point associated with a client network, an indication of a tethering delay associated with the client network; transmitting, to a network controller of the wireless communication network, a request for a tethering delay budget associated with a QoS flow, wherein the tethering delay budget is based at least in part on the tethering delay associated with the client network; receiving, from the network controller, a communication associated with the QoS flow, and wherein one or more QoS parameters for the QoS flow are configured, by the network controller, based at least in part on the tethering delay budget; and transmitting, to the access point, the communication.

Aspect 24: The method of Aspect 23, wherein the UE is an FWA UE.

Aspect 25: The method of any of Aspects 23-24, wherein the access point is a WLAN access point.

Aspect 26: The method of any of Aspects 23-25, wherein the UE and the access point are co-located.

Aspect 27: The method of any of Aspects 23-26, wherein the tethering delay associated with the client network is based at least in part on an uplink tethering delay and a downlink tethering delay.

Aspect 28: The method of Aspect 27, wherein the downlink tethering delay is based at least in part on a measurement performed by the access point, and wherein the uplink tethering delay is based at least in part on an estimation associated with a channel load performed by the access point.

Aspect 29: The method of Aspect 27, wherein the downlink tethering delay is based at least in part on a measurement performed by the access point, and wherein the uplink tethering delay is based at least in part on a measurement performed by a client device associated with the client network and transmitted to the access point by the client device.

Aspect 30: The method of any of Aspects 23-29, wherein the network controller is associated with one of an SMF of the wireless communication network or a PCF of the wireless communication network.

Aspect 31: The method of any of Aspects 23-30, wherein the configuration of the one or more QoS parameters for the QoS flow is based at least in part on a determination of whether to grant the request for the tethering delay budget based at least in part on a subscription status of the UE.

Aspect 32: The method of any of Aspects 23-31, wherein the configuration of one or more QoS parameters for the QoS flow is based at least in part on reducing a PDB by the tethering delay budget.

Aspect 33: The method of any of Aspects 23-32, further comprising: transmitting, to the network controller, a request for another tethering delay budget associated with the QoS flow; and receiving, from the network controller, a rejection of the request for the other tethering delay budget based at least in part on a determination that the wireless communication network cannot support a PDB reduced by the other tethering delay budget.

Aspect 34: The method of any of Aspects 23-33, wherein the tethering delay budget is based at least in part on a default tethering delay budget associated with at least one of the client network or a client device.

Aspect 35: The method of any of Aspects 23-34, wherein the request for the tethering delay budget includes an indication of a first tethering delay budget associated with a first access category and a second tethering delay budget associated with a second access category that is different from the first access category.

Aspect 36: The method of Aspect 35, further comprising transmitting, to the network controller, an indication of a preferred tethering delay budget, wherein the preferred tethering delay budget is one of the first tethering delay budget and the second tethering delay budget, and wherein the one or more QoS parameters are configured based at least in part on the indication of the preferred tethering delay budget.

Aspect 37: The method of any of Aspects 23-36, wherein the network controller is associated with a network node of the wireless communication network.

Aspect 38: The method of Aspect 37, wherein the request for the tethering delay budget is transmitted via one of an RRC message or a MAC-CE message.

Aspect 39: The method of Aspect 37, wherein the configuration of the one or more QoS parameters for the QoS flow is based at least in part on reducing an AN-PDB by the tethering delay budget.

Aspect 40: The method of Aspect 37, wherein the configuration of one or more QoS parameters for the QoS flow is based at least in part on the network controller receiving a configuration of at least one of a subscription parameter indicating whether the network controller is permitted to grant the request for the tethering delay budget, an indication to grant the request for the tethering delay budget, or a range of permitted tethering delay budgets.

Aspect 41: The method of any of Aspects 23-40, wherein an indication of the tethering delay is received by the network controller from a client device associated with the client network.

Aspect 42: The method of Aspect 41, wherein the tethering delay associated with the client network is based at least in part on an uplink tethering delay and a downlink tethering delay, wherein the uplink tethering delay is based at least in part on a measurement performed by the client device, and wherein the downlink tethering delay is based at least in part on an estimation performed by the client device.

Aspect 43: The method of Aspect 41, wherein the tethering delay associated with the client network is based at least in part on an uplink tethering delay and a downlink tethering delay, wherein the uplink tethering delay is based at least in part on a measurement performed by the client device, and wherein the downlink tethering delay is based at least in part on a measurement performed by the access point.

Aspect 44: The method of Aspect 41, wherein the network controller receives the indication of the tethering delay via a UPF of the wireless communication network.

Aspect 45: An apparatus for wireless communication at a device, comprising a processor; memory coupled with the processor; and instructions stored in the memory and executable by the processor to cause the apparatus to perform the method of one or more of Aspects 1-22.

Aspect 46: A device for wireless communication, comprising a memory and one or more processors coupled to the memory, the one or more processors configured to perform the method of one or more of Aspects 1-22.

Aspect 47: An apparatus for wireless communication, comprising at least one means for performing the method of one or more of Aspects 1-22.

Aspect 48: A non-transitory computer-readable medium storing code for wireless communication, the code comprising instructions executable by a processor to perform the method of one or more of Aspects 1-22.

Aspect 49: A non-transitory computer-readable medium storing a set of instructions for wireless communication, the set of instructions comprising one or more instructions that, when executed by one or more processors of a device, cause the device to perform the method of one or more of Aspects 1-22.

Aspect 50: An apparatus for wireless communication at a device, comprising a processor; memory coupled with the processor; and instructions stored in the memory and executable by the processor to cause the apparatus to perform the method of one or more of Aspects 23-44.

Aspect 51: A device for wireless communication, comprising a memory and one or more processors coupled to the memory, the one or more processors configured to perform the method of one or more of Aspects 23-44.

Aspect 52: An apparatus for wireless communication, comprising at least one means for performing the method of one or more of Aspects 23-44.

Aspect 53: A non-transitory computer-readable medium storing code for wireless communication, the code comprising instructions executable by a processor to perform the method of one or more of Aspects 23-44.

Aspect 54: A non-transitory computer-readable medium storing a set of instructions for wireless communication, the set of instructions comprising one or more instructions that, when executed by one or more processors of a device, cause the device to perform the method of one or more of Aspects 23-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network controller associated with a wireless communication network, comprising:

a memory; and one or more processors, coupled to the memory, configured to:

receive, from a user equipment (UE), a request for a tethering delay budget associated with a quality of service (QoS) flow, wherein the UE is in communication with an access point associated with a client network, and wherein the tethering delay budget is based at least in part on a tethering delay associated with the client network;

configure one or more QoS parameters, associated with the wireless communication network, for the QoS flow, wherein the one or more QoS parameters are configured based at least in part on the tethering delay budget; and transmit, to the UE, a communication based at least in part on the one or more QoS parameters.

2. The apparatus of claim 1, wherein the tethering delay associated with the client network is based at least in part on an uplink tethering delay and a downlink tethering delay.

3. The apparatus of claim 2, wherein the downlink tethering delay is based at least in part on a measurement performed by the access point, and wherein the uplink tethering delay is based at least in part on an estimation associated with a channel load performed by the access point.

4. The apparatus of claim 1, wherein the network controller is associated with one of a session management function (SMF) of the wireless communication network or a policy control function (PCF) of the wireless communication network.

5. The apparatus of claim 1, wherein the one or more processors are further configured to determine whether to grant the request for the tethering delay budget based at least in part on a subscription status of the UE.

6. The apparatus of claim 1, wherein configuring the one or more QoS parameters for the QoS flow is based at least in part on reducing a packet delay budget (PDB) by the tethering delay budget.

7. The apparatus of claim 1, wherein the one or more processors are further configured to:

receive, from the UE, a request for another tethering delay budget associated with the QoS flow;

reduce a packet delay budget (PDB) by the other tethering delay budget; and reject the request for the other tethering delay budget based at least in part on determining that the wireless communication network cannot support the PDB reduced by the other tethering delay budget.

8. The apparatus of claim 1, wherein the tethering delay budget is based at least in part on a default tethering delay budget associated with at least one of the client network or a client device.

9. The apparatus of claim 1, wherein the request for the tethering delay budget includes an indication of a first tethering delay budget associated with a first access category and a second tethering delay budget associated with a second access category that is different from the first access category.

10. The apparatus of claim 9, wherein the one or more processors are further configured to receive, from the UE, an indication of a preferred tethering delay budget, wherein the preferred tethering delay budget is one of the first tethering delay budget and the second tethering delay budget, and wherein the one or more QoS parameters are configured based at least in part on the indication of the preferred tethering delay budget.

11. The apparatus of claim 1, wherein the network controller is associated with a network node of the wireless communication network.

12. The apparatus of claim 11, wherein the request for the tethering delay budget is received via one of a radio resource control (RRC) message or a medium access control (MAC) control element (MAC-CE) message.

13. The apparatus of claim 11, wherein configuring the one or more QoS parameters for the QoS flow is based at least in part on reducing an access network packet delay budget (AN-PDB) by the tethering delay budget.

14. The apparatus of claim 11, wherein the one or more processors are further configured to receive a configuration of at least one of a subscription parameter indicating whether the network controller is permitted to grant the request for the tethering delay budget, an indication to grant the request for the tethering delay budget, or a range of permitted tethering delay budgets.

15. An apparatus for wireless communication at a user equipment (UE) associated with a wireless communication network, comprising:

a memory; and one or more processors, coupled to the memory, configured to:

receive, from an access point associated with a client network, an indication of a tethering delay associated with the client network;

transmit, to a network controller of the wireless communication network, a request for a tethering delay budget associated with a quality of service (QoS) flow, wherein the tethering delay budget is based at least in part on the tethering delay associated with the client network;

receive, from the network controller, a communication associated with the QoS flow, and wherein one or more QoS parameters for the QoS flow are configured, by the network controller, based at least in part on the tethering delay budget; and transmit, to the access point, the communication.

16. The apparatus of claim 15, wherein the tethering delay associated with the client network is based at least in part on an uplink tethering delay and a downlink tethering delay.

17. The apparatus of claim 16, wherein the downlink tethering delay is based at least in part on a measurement performed by the access point, and wherein the uplink tethering delay is based at least in part on an estimation associated with a channel load performed by the access point.

18. The apparatus of claim 15, wherein the network controller is associated with one of a session management function (SMF) of the wireless communication network or a policy control function (PCF) of the wireless communication network.

19. The apparatus of claim 15, wherein the configuration of the one or more QoS parameters for the QoS flow is based at least in part on a determination of whether to grant the request for the tethering delay budget based at least in part on a subscription status of the UE.

20. The apparatus of claim 15, wherein the configuration of one or more QoS parameters for the QoS flow is based at least in part on reducing a packet delay budget (PDB) by the tethering delay budget.

21. The apparatus of claim 15, wherein the one or more processors are further configured to:

transmit, to the network controller, a request for another tethering delay budget associated with the QoS flow; and receive, from the network controller, a rejection of the request for the other tethering delay budget based at least in part on a determination that the wireless communication network cannot support a packet delay budget (PDB) reduced by the other tethering delay budget.

22. The apparatus of claim 15, wherein the tethering delay budget is based at least in part on a default tethering delay budget associated with at least one of the client network or a client device.

23. The apparatus of claim 15, wherein the network controller is associated with a network node of the wireless communication network.

24. The apparatus of claim 23, wherein the request for the tethering delay budget is transmitted via one of a radio resource control (RRC) message or a medium access control (MAC) control element (MAC-CE) message.

25. The apparatus of claim 23, wherein the configuration of the one or more QoS parameters for the QoS flow is based at least in part on reducing an access network packet delay budget (AN-PDB) by the tethering delay budget.

26. The apparatus of claim 23, wherein the configuration of one or more QoS parameters for the QoS flow is based at least in part on the network controller receiving a configuration of at least one of a subscription parameter indicating whether the network controller is permitted to grant the request for the tethering delay budget, an indication to grant the request for the tethering delay budget, or a range of permitted tethering delay budgets.

27. A method of wireless communication performed by a network controller of a wireless communication network, comprising:

receiving, from a user equipment (UE), a request for a tethering delay budget associated with a quality of service (QoS) flow, wherein the UE is in communication with an access point associated with a client network, and wherein the tethering delay budget is based at least in part on a tethering delay associated with the client network;

configuring one or more QoS parameters, associated with the wireless communication network, for the QoS flow, wherein the one or more QoS parameters are configured based at least in part on the tethering delay budget; and transmitting, to the UE, a communication based at least in part on the one or more QoS parameters.

28. The method of claim 27, wherein the network controller is associated with one of a session management function (SMF) of the wireless communication network or a policy control function (PCF) of the wireless communication network.

29. A method of wireless communication performed by a user equipment (UE) associated with a wireless communication network, comprising:

receiving, from an access point associated with a client network, an indication of a tethering delay associated with the client network;

transmitting, to a network controller of the wireless communication network, a request for a tethering delay budget associated with a quality of service (QoS) flow, wherein the tethering delay budget is based at least in part on the tethering delay associated with the client network;

receiving, from the network controller, a communication associated with the QoS flow, and wherein one or more QoS parameters for the QoS flow are configured, by the network controller, based at least in part on the tethering delay budget; and transmitting, to the access point, the communication.

30. The method of claim 29, wherein the tethering delay budget is based at least in part on a default tethering delay budget associated with at least one of the client network or a client device.

* * * * *